Aug. 16, 1955 R. M. PHILLIPS 2,715,474
CLOSURE LINERS AND METHODS
Filed June 9, 1949
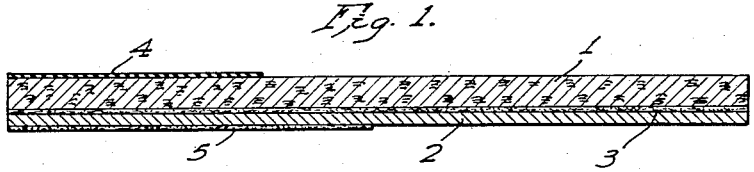
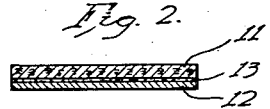 
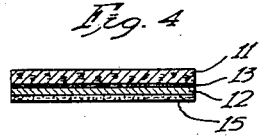 
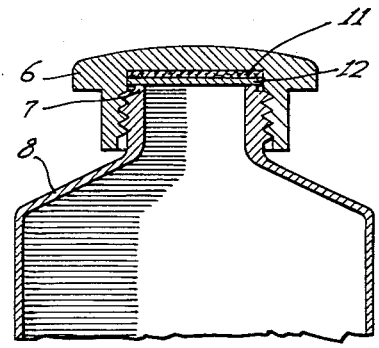
INVENTOR.
Robert M. Phillips.
BY
Robert T. Teeter
ATTORNEY:-

United States Patent Office 2,715,474
Patented Aug. 16, 1955

2,715,474

CLOSURE LINERS AND METHODS

Robert M. Phillips, Englewood, N. J., assignor to Aluminum Company of America, Pittsburgh, Pa., a corporation of Pennsylvania Application June 9, 1949, Serial No. 98,126

6 Claims. (Cl. 215—40)

This invention relates to composite materials for closure liners, composite liners for closures, closures comprising caps having composite liners secured therein, and methods of closing containers by assembling on container orifices, caps having composite liners secured therein. The invention is particularly concerned with the sealing of containers by means of closure caps which may be used as re-seal closures. The invention is characterized by the use of cork as the cushion material for composite closure liners, by the use of a non-absorbent and fluid impervious facing for the cork, and by the use of a film of wax to adhere the facing to the cork. Other features of construction which may be employed include the use of a layer of paper between the cork cushion and the cap, and the use of a heat sealing material upon the outer surface of the facing.

It is a common practice to provide a closure cap for a container with a cushioning liner of cork. It is also common practice to face the cork cushion with a thin, fluid impervious material such as cellulose material or metal foil. The facing may be bonded to the orifice of the closure by an adhesive material so as to produce an inner seal. The present invention is concerned with improvements upon the materials and methods with which such a closure cap is employed, particularly with reference to the temporary retention of the facing within the closure cap between the time at which the facing is inserted in the cap and the time at which the cap is assembled on the container orifice.

In the past it has been proposed to retain the liner facing in a closure cap by frictional engagement of its periphery with the inner walls of the closure cap, or by using an adhesive between the facing and the cushion element so as to permanently hold the facing in the cap, or by employing an air excluding stratum of oil between the facing and the cushion element so as to temporarily hold the facing in the cap. The retention of the facing by friction alone is not positive, and is undesirable since the facing is fragile and easily wrinkled or distorted if it is separately inserted in the closure cap. The use of an adhesive to bond the facing to the cushion element is undesirable when the facing is to be bonded to the orifice of the container, since either the bond between the facing and the cushion element or that between the facing and the container orifice must be broken when the cap is removed from the container. The use of oil to temporarily hold the facing to the cushion element is unreliable, and also is unsatisfactory because there is no bond between the facing and the cushion element of such strength as will permit the manufacture and use of either composite liner materials or compostie liners that are of unitary nature.

One object of the invention is to provide a composite material for closure liners having a cushioning layer and a facing layer adhered to each other temporarily by a material normally functioning as an adhesive. Another object is the provision of composite closure liners having a cushioning layer and a facing adhered thereto by a material which will temporarily retain the facing when the composite liners are inserted in closure caps and during application of the closure caps to container orifices. Another object is the provision of a composite liner in a closure cap which will permit separation of the facing material from the cushioning material thereof after assembly of the closure cap on the container. A further object is the provision of composite materials for closure liners, composite liners, and caps having composite liners retained therein, in each of which the facing layer is temporarily adhered to an absorbent cushioning layer by a material which may be absorbed by the cushioning material so as to permit ready separation of the layers. Another object is to provide materials and methods by which closure caps may be provided with composite liners and assembled upon container orifices without difficulty, and which permit removal of the closure caps and the cushioning layer of the composite liner after the facing layer of the composite liner has been bonded to the orifice of the container.

In the drawing, Fig. 1 is an enlarged sectional view of my new composite material for closure liners; Figs. 2 through 5 are enlarged sectional views of various forms of my new composite liner for closures; and Fig. 6 is a sectional view of a closure cap, employing a composite liner, as it appears when assembled upon a container orifice.

In Fig. 1 there is shown a preferred form of my composite material for closure liners, certain features thereof being optional. The composite material consists of a cork layer 1 and a facing layer 2 of non-absorbent and fluid impervious material. The cork layer 1 and facing layer 2 are adhered to each other by a film of wax 3. These are the essential components of my composite material. However, it will usually be convenient and desirable to provide on the inner surface of the composite material (i. e. the surface which will be turned toward the interior of the closure cap) a thin layer of paper 4 adhered to the cork layer 1 by a suitable adhesive. The purpose of the layer of paper 4 is to provide a surface that may be readily adhered to the interior of a closure cap. Also it will usually be convenient and desirable to provide on the outer surface of the facing 2 a coating of heat sealing adhesive 5. The purpose of the heat sealing adhesive 5 is to provide a means of readily adhering the facing 2 to the orifice of a container.

The cork layer 1 may be natural or composition cork, which will be found to be somewhat absorbent; it may be about $\frac{1}{32}$ to $\frac{1}{8}$ inch thick, more or less, as desired. The facing 2 may be a cellulose, plastic, or metal foil material, which will be found to be non-absorbent and fluid impervious; it may be aluminum foil about .001 inch thick, for example. The wax 3 may be a petroleum base wax or the like, which is solid at room temperature and fluid at elevated temperatures, preferably above 150° F.; it should be employed in a film which will be largely absorbed by the cork layer 1 when held for a few minutes at temperatures at which the wax is fluid. It is preferred that the wax 3 be a pressure sensitive, microcrystalline type of wax.

The paper layer 4, if provided, may be of any suitable thickness and may be adhered to the cork layer 1 by known methods. The heat sealing adhesive 5 may be any thermoplastic or thermosetting cement, resin, or the like, suited to the adhesion of the particular facing 2 to the particular type of container orifice for which it is intended. As a heat sealing adhesive coating on an aluminum foil facing, I recommend a heat sealing vinyl lacquer.

The composite material for closure liners, or individual composite liners, may be made up by subjecting the cork layer and the facing layer to heat and pressure after interposing a film of wax therebetween. It may be noted that this procedure should be carried out at the lowest temperatures at which the wax will flow and bond so as to minimize the amount of initial absorption of wax by the cork. I have found that this can be done by properly controlling the temperature of a reservoir of wax which is distributed by a heated metal roller after application to the cork. By using this method, the layer of wax will ordinarily be about 0.01 inch thick and will weight about 12 milligrams per square inch.

The simplest form of my new composite closure liner is shown in Fig. 2, and consists of a cork cushion 11 and a facing 12 adhered to each other by a film of wax 13. This composite liner may be embellished by providing a paper layer 14 on the cork cushion 11 as in Fig. 3, or by providing a heat sealing adhesive 15 on the outer surface of the facing 12 as in Fig. 4. Both the paper layer 14 and the heat sealing adhesive 15 are included in the preferred form of composite liner shown in Fig. 5.

The composite liners of Figs. 2 and 4, for example, may be secured within closure caps by frictional engagement of the same with the periphery of the composite liners, whereas the facing 12 could not separately be so secured, to a satisfactory extent, if not adhered to the cork cushion 11. The composite liners of Figs. 3 and 5, for example, may be more firmly secured within closure caps by gluing or cementing the paper layer 14 to the interior of the closure caps. Further, the composite liners of Figs. 4 and 5 may be readily heat sealed to the orifices of containers by means of the heat sealing adhesive 15, whereas the composite liners of Figs. 2 and 3 must be adhered to the orifices of containers by separate application of adhesive thereto, or to the mouth of the container, as may be desired.

In the assembly of Fig. 6, the cork cushion 11 and facing 12 are clearly illustrated, and it is to be understood that any of the composite liners in Figs. 2 through 5 may be employed in the closure cap 6 shown in Fig. 6, wherein the closure cap 6 is shown assembled upon the orifice 7 of the container 8.

My preferred method of employing the materials described above is to secure a composite liner of the type described within the closure cap 6 and to assemble the cap on the orifice 7 of the container 8 with an adhesive interposed between the facing 12 and the orifice 7. Thereafter it is necessary to heat the assembled cap and container to a temperature above the melting point of the wax 13 for a time sufficient to cause the wax to be substantially absorbed by the cork cushion 11. Typical waxes that may be employed have melting points around 150° F. If the assembly of cap and container is heated to above 150° F. for several minutes, the wax is found to be absorbed by the cork cushion 11 and the closure cap 6 and cork cushion 11 can be readily removed from the container without disturbing the facing 12, which is adhered to the container orifice 7.

Various heating operations are normally employed in the production of containers such as collapsible tubes. They are usually heated to dry a lacquer or printing ink and, if a heating sealing adhesive is used, to make an hermetic inner seal between a portion of the closure and the container orifice. The absorption of wax 13 by the cork cushion 11 may be effected during such heating operations. When using a vinyl heat sealing adhesive 15 on the surface of a foil facing 12, the closure-container assembly may conveniently be heated to about 275° F. for a period of about 5 minutes. When an inner seal is effected by heating the package to such temperatures for such times, the absorption of the film of wax 13 by the cork cushion 11 is practically complete, and the caps 6 and cork cushion 11 are readily removed without disturbing the inner seal made by the facing 12 which remains adhered to the orifice 7 by the adhesive 15. However, the facing 12 may then be readily removed from the orifice 7, and the cap 6 (with cork cushion 11) may be used as a re-seal closure.

It is seen that my invention has particular applicability to collapsible tube packaging, but that it may also be applied to other packaging systems.

I claim:

1. A composite material for closure liners comprising a wax-absorbent, cushioning cork layer, a separable, non-absorbent and fluid impervious facing layer, and a film of wax about .001 inch thick interposed between said layers and adhering the same to each other without substantial absorption of wax in said cork layer, said cork layer being adapted to substantially absorb said wax film upon heating so as to permit ready separation of said layers thereafter.

2. A composite material according to claim 1 in which said facing layer has a heat sealing adhesive on its outer surface.

3. A composite liner for closures comprising a wax-absorbent, cushioning cork layer, a separable, non-absorbent and fluid impervious facing layer, a heat sealing adhesive on the outer surface of said facing layer, and a film of wax about .001 inch thick interposed between said layers and temporarily adhering the same to each other without substantial absorption of wax in said cork layer, said adhesive being adapted to bond said facing layer to a container orifice to produce an inner seal upon heating and said cork layer being adapted to substantially absorb said wax film upon such heating so as to permit ready separation of said layers thereafter without disturbing the inner seal.

4. A re-seal closure comprising a cap and a wax-absorbent, cushioning cork layer secured therein to which a separable, non-absorbent and fluid impervious facing layer having a heat sealing adhesive on the outer surface thereof is temporarily adhered by an interposed film of wax about .001 inch thick without substantial absorption of the wax in said cork layer, said adhesive being adapted to bond said facing layer to a container orifice to produce an inner seal upon heating and said cork layer being adapted to substantially absorb said wax film upon such heating so as to permit ready separation of said layers thereafter without disturbing the inner seal, whereby the cap and cork layer may be readily removed and employed to re-seal the container orifice after removal of the facing layer forming the inner seal.

5. A method of closing a container with a separable, non-absorbent and fluid impervious facing layer, a wax-absorbent, cushioning cork layer and a cap which comprises securing the cork layer in the cap, temporarily adhering the facing layer to the cork layer by an interposed film of wax without substantial absorption of the wax in said cork layer, assembling the cap on the container orifice with an adhesive interposed between the facing layer and the container orifice for bonding the same together and producing an inner seal, heating the assembly so made to a temperature above the melting point of the wax for a time sufficient for the cork layer to substantially absorb the film of wax, thereby permitting ready separation of the cork and facing layer thereafter without disturbing the inner seal, whereby the cap and cork layer may be readily removed and employed to re-seal the container orifice after removal of the facing layer forming the inner seal.

6. A method according to claim 5 in which the adhesive interposed between the facing layer and the container orifice is heat sealing and the temperature and time of heating are, furthermore, sufficient to heat seal the facing layer to the container orifice.

References Cited in the file of this patent

UNITED STATES PATENTS

| | | |
|---|---|---|
| 859,121 | Schmidt | July 2, 1907 |
| 901,651 | Schmidt | Oct. 20, 1908 |
| 1,618,491 | Taliaferro | Feb. 22, 1927 |

(Other references on following page)

UNITED STATES PATENTS

| Number | Name | Date |
|---|---|---|
| 1,779,884 | Lange | Oct. 28, 1930 |
| 1,916,977 | Gutmann | July 4, 1933 |
| 1,966,273 | Waring | July 10, 1934 |
| 1,983,520 | Charch | Dec. 11, 1934 |
| 2,013,119 | Warth | Sept. 3, 1935 |
| 2,026,937 | Eisen | Jan. 7, 1936 |
| 2,073,750 | McManus | Mar. 16, 1937 |
| 2,077,992 | Eisen | Apr. 20, 1937 |
| 2,138,419 | Gavin | Nov. 29, 1938 |
| 2,151,019 | Eisen | Mar. 21, 1939 |
| 2,166,289 | Finke | July 18, 1939 |
| 2,233,160 | Eisen | Feb. 25, 1941 |
| 2,242,256 | McManus | May 10, 1941 |
| 2,354,855 | Emanuel | Aug. 1, 1944 |
| 2,376,899 | Bulatkin | May 29, 1945 |
| 2,387,439 | Grabus, Jr., et al. | Oct. 23, 1945 |
| 2,419,304 | Warth et al. | Apr. 22, 1947 |